(12) United States Patent
Hakeem et al.

(10) Patent No.: US 11,255,288 B2
(45) Date of Patent: Feb. 22, 2022

(54) METHOD AND SYSTEM FOR DETERMINING ENGINE KNOCK BACKGROUND NOISE LEVELS

(71) Applicant: Ford Global Technologies, LLC, Dearborn, MI (US)

(72) Inventors: Mohannad Hakeem, Dearborn, MI (US); Arney Yogesh Karnik, Canton, MI (US); James Kindree, South Lyon, MI (US); Christopher Glugla, Macomb, MI (US); Robert Baskins, Grass Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 387 days.

(21) Appl. No.: 15/987,162

(22) Filed: May 23, 2018

(65) Prior Publication Data
US 2019/0360420 A1   Nov. 28, 2019

(51) Int. Cl.
| | | |
|---|---|---|
| *F02D 41/28* | (2006.01) | |
| *F02D 41/14* | (2006.01) | |
| *F02D 41/00* | (2006.01) | |
| *F02P 5/152* | (2006.01) | |
| *F02D 35/02* | (2006.01) | |

(52) U.S. Cl.
CPC ........... *F02D 41/28* (2013.01); *F02D 35/027* (2013.01); *F02D 41/009* (2013.01); *F02D 41/1498* (2013.01); *F02P 5/152* (2013.01); *F02D 2041/281* (2013.01); *F02D 2041/286* (2013.01)

(58) Field of Classification Search
CPC .............. F02D 35/027; F02D 41/1498; F02D 2041/28; F02D 2041/281; F02D 2041/286; F02D 2041/1432; F02D 2200/025; G01L 23/22; G01L 23/221; G01L 23/225; F02P 5/152
See application file for complete search history.

(56) References Cited

U.S. PATENT DOCUMENTS

| | | | | | |
|---|---|---|---|---|---|
| 4,329,871 | A | * | 5/1982 | Grossner | F02P 5/152 73/35.03 |
| 4,344,318 | A | * | 8/1982 | Dudeck | G01L 23/225 73/35.03 |
| 4,345,558 | A | * | 8/1982 | Yamaguchi | G01L 23/225 123/406.35 |
| 5,115,779 | A | * | 5/1992 | Itoyama | G01L 23/225 123/406.35 |
| 5,230,316 | A | * | 7/1993 | Ichihara | G01L 23/225 123/406.38 |

(Continued)

FOREIGN PATENT DOCUMENTS

| | | | | |
|---|---|---|---|---|
| DE | 102004036502 A1 | * | 4/2006 | ........... G01L 23/225 |
| FR | 2916803 A3 | * | 12/2008 | ........... G01M 15/08 |

(Continued)

*Primary Examiner* — John M Zaleskas
(74) *Attorney, Agent, or Firm* — Geoffrey Brumbaugh; McCoy Russell LLP (57) ABSTRACT

Methods and systems are provided for operating a variable displacement engine that includes a knock control system. Engine knock background noise levels determined during all cylinders operating mode may be determined via two filters that are constructed in parallel. Output of the two filters may be the basis for determining the presence or absence of engine knock.

20 Claims, 6 Drawing Sheets

(56) References Cited

U.S. PATENT DOCUMENTS

| | | | | |
|---|---|---|---|---|
| 5,373,448 A * | 12/1994 | Katogi | G01L 23/225 | 123/435 |
| 5,400,644 A * | 3/1995 | Remboski, Jr | G01L 23/225 | 701/111 |
| 5,608,633 A * | 3/1997 | Okada | G01L 23/225 | 123/406.38 |
| 5,996,398 A * | 12/1999 | Schleupen | G01L 23/225 | 73/35.05 |
| 6,246,953 B1 * | 6/2001 | Quinn | F02P 5/1525 | 701/111 |
| 6,289,720 B1 * | 9/2001 | Ohkubo | F02D 41/1498 | 73/35.01 |
| 6,736,109 B2 * | 5/2004 | Hoshino | G01L 23/225 | 123/406.29 |
| 6,750,798 B2 * | 6/2004 | Honda | G01L 23/225 | 123/406.34 |
| 6,845,312 B1 * | 1/2005 | Cross | G01L 23/225 | 701/111 |
| 6,932,056 B1 * | 8/2005 | Tartt | F02P 5/152 | 123/406.37 |
| 2004/0030486 A1 * | 2/2004 | Sauler | F02P 5/1522 | 701/111 |
| 2004/0204814 A1 * | 10/2004 | Honda | G01L 23/225 | 701/111 |
| 2005/0000272 A1 * | 1/2005 | Takemura | G01L 23/225 | 73/35.01 |
| 2005/0241369 A1 * | 11/2005 | Inoue | G01L 23/225 | 73/35.09 |
| 2006/0117834 A1 * | 6/2006 | Goto | G01L 23/225 | 73/35.09 |
| 2006/0129304 A1 * | 6/2006 | Takemura | G01L 23/225 | 701/111 |
| 2006/0142925 A1 * | 6/2006 | Kaneko | G01L 23/225 | 701/111 |
| 2006/0144365 A1 * | 7/2006 | Miyashita | F02D 35/027 | 123/431 |
| 2006/0185422 A1 * | 8/2006 | Iwade | G01L 23/225 | 73/35.09 |
| 2006/0236753 A1 * | 10/2006 | Yoshihara | G01L 23/225 | 73/35.09 |
| 2006/0236754 A1 * | 10/2006 | Oe | G01L 23/221 | 73/35.09 |
| 2006/0288981 A1 * | 12/2006 | Kaneko | F02P 5/1527 | 123/406.37 |
| 2007/0000307 A1 * | 1/2007 | Yoshihara | G01L 23/225 | 73/35.09 |
| 2007/0012090 A1 * | 1/2007 | Yoshihara | G01L 23/225 | 73/35.09 |
| 2007/0028893 A1 * | 2/2007 | Hernandez | F02D 35/027 | 123/406.16 |
| 2007/0062488 A1 * | 3/2007 | Kobayashi | F02D 35/027 | 123/406.16 |
| 2007/0084266 A1 * | 4/2007 | Kaneko | G01L 23/225 | 73/35.03 |
| 2007/0175444 A1 * | 8/2007 | Kaneko | F02P 5/152 | 123/406.16 |
| 2007/0214869 A1 * | 9/2007 | Kaneko | G01L 23/225 | 73/35.09 |
| 2007/0215108 A1 * | 9/2007 | Kaneko | F02P 5/152 | 123/406.34 |
| 2007/0215109 A1 * | 9/2007 | Kaneko | G01L 23/225 | 123/406.34 |
| 2007/0289575 A1 * | 12/2007 | Yoshihara | F02D 35/027 | 123/406.29 |
| 2008/0000448 A1 * | 1/2008 | Kaneko | F02P 5/152 | 123/406.37 |
| 2008/0000449 A1 * | 1/2008 | Kaneko | F02D 35/027 | 123/406.37 |
| 2008/0120018 A1 * | 5/2008 | Wiles | F01L 1/022 | 701/111 |
| 2008/0208439 A1 * | 8/2008 | Miyashita | F02D 41/3094 | 701/111 |
| 2008/0234918 A1 * | 9/2008 | Kaneko | G01L 23/225 | 701/111 |
| 2008/0262705 A1 * | 10/2008 | Oe | G01L 23/225 | 701/111 |
| 2008/0294328 A1 * | 11/2008 | Kaneko | G01L 23/225 | 701/111 |
| 2009/0005956 A1 * | 1/2009 | Yoshihara | F02D 35/027 | 701/111 |
| 2009/0038384 A1 * | 2/2009 | Kaneko | F02D 35/027 | 73/114.07 |
| 2009/0043484 A1 * | 2/2009 | Yoshihara | F02D 35/027 | 701/111 |
| 2009/0120410 A1 * | 5/2009 | Kaneko | F02P 5/152 | 123/406.38 |
| 2009/0150058 A1 * | 6/2009 | Kaneko | G01L 23/225 | 701/111 |
| 2009/0158816 A1 * | 6/2009 | Kaneko | F02D 35/027 | 73/35.09 |
| 2009/0211337 A1 * | 8/2009 | Masuda | G01L 23/225 | 73/35.09 |
| 2009/0217908 A1 * | 9/2009 | Watanabe | F01L 1/34 | 123/406.37 |
| 2009/0223280 A1 * | 9/2009 | Masuda | G01L 23/225 | 73/35.09 |
| 2009/0223281 A1 * | 9/2009 | Masuda | G01L 23/225 | 73/35.09 |
| 2009/0308367 A1 | 12/2009 | Glugla | | |
| 2010/0162793 A1 * | 7/2010 | Kaneko | G01L 23/225 | 73/35.01 |
| 2010/0162794 A1 * | 7/2010 | Kaneko | G01L 23/225 | 73/35.09 |
| 2010/0162795 A1 * | 7/2010 | Kaneko | G01L 23/225 | 73/35.09 |
| 2010/0212634 A1 * | 8/2010 | Yoshihara | G01L 23/225 | 123/406.24 |
| 2011/0153182 A1 * | 6/2011 | Sasaki | F02D 35/027 | 701/111 |
| 2011/0257872 A1 * | 10/2011 | Masuda | G01L 23/225 | 701/111 |
| 2012/0192833 A1 * | 8/2012 | Hagari | F02D 35/027 | 123/406.35 |
| 2013/0151128 A1 * | 6/2013 | Ono | F02P 5/152 | 701/111 |
| 2014/0000552 A1 * | 1/2014 | Glugla | F02D 41/1498 | 123/295 |
| 2014/0000557 A1 * | 1/2014 | Glugla | F02D 13/0261 | 123/435 |
| 2014/0278010 A1 * | 9/2014 | Hamama | F02D 35/027 | 701/106 |
| 2014/0350823 A1 * | 11/2014 | Glugla | F02D 41/0087 | 701/104 |
| 2016/0138551 A1 * | 5/2016 | Cavan | F02D 35/027 | 123/406.13 |
| 2016/0187219 A1 * | 6/2016 | Bizub | G01L 23/221 | 702/191 |
| 2016/0187220 A1 * | 6/2016 | Bizub | F02D 35/027 | 73/35.09 |
| 2016/0223422 A1 * | 8/2016 | Bizub | F02D 35/027 | |
| 2016/0238478 A1 * | 8/2016 | Bizub | F02D 35/027 | |
| 2016/0290884 A1 * | 10/2016 | Bizub | G01L 23/221 | |
| 2016/0298537 A1 * | 10/2016 | Matthews | G01M 15/12 | |
| 2017/0051688 A1 * | 2/2017 | Glugla | F02D 35/027 | |
| 2017/0328333 A1 * | 11/2017 | Attard | F02P 17/12 | |

FOREIGN PATENT DOCUMENTS

| | | | | |
|---|---|---|---|---|
| JP | 2016079840 A | * | 5/2016 | F02D 35/027 |
| WO | 2009020016 A1 | | 2/2009 | |

* cited by examiner

METHOD AND SYSTEM FOR DETERMINING ENGINE KNOCK BACKGROUND NOISE LEVELS

FIELD

The present application relates to methods and systems for establishing engine knock background noise levels that are dependent on operation of noise generating devices and detecting engine knock responsive to the established engine knock background noise levels.

BACKGROUND/SUMMARY

An internal combustion engine may experience knock after ignition in one or more engine cylinders has been initiated by a spark and when end gases are ignited by elevated temperatures and pressures in the cylinders. The end gases are not ignited by flames kernels that are produced by the sparks in the cylinders. Engine knock occurs most often at higher engine loads when pressure in the engine's cylinders is high.

Engines may also be operated with a variable number of active or deactivated cylinders, also referred to as variable displacement engines (or VDE), so that engine fuel economy may be increased for a desired engine torque output while optionally maintaining an overall exhaust mixture air-fuel ratio about stoichiometry. In some examples, half of an engine's cylinders may be disabled during selected conditions, where the selected conditions can be defined by parameters such as an engine speed/load window, vehicle speed, etc. In still other examples, cylinders may be individually and selectively deactivated.

If an engine is operated with fewer than all of its cylinders being activated to provide a desired engine torque output, pressures in the active engine cylinders will be higher than pressure in engine cylinders if all engine cylinders had been activated to provide the same desired engine torque. Consequently, the engine may tend to experience knock at lower driver demand torques as compared to if the engine were always operated with all of its cylinders being active.

Engine knock may be controlled on a VDE by activating cylinders and/or retarding spark in active cylinders. However, engine knock is often identified by comparing a background engine noise (e.g., vibration) level against an engine noise level during a crankshaft interval where there is a higher propensity for engine knock. A background engine noise level may decrease when engine cylinders are deactivated and the background engine noise level may increase when deactivated engine cylinders are reactivated. The changing level of background noise may cause the engine knock control system to indicate engine knock when no engine knock is present and it may also cause the engine knock control system to not indicate engine knock when engine knock is present. Therefore, it would be desirable to provide a way of increasing the reliability of the engine knock control system when an engine transitions between VDE modes.

The inventors herein have recognized that engine knock detection may be compromised during VDE mode changes and have developed an engine operating method, comprising: inputting a rectified and integrated knock sensor output signal into two filters that are constructed in parallel; and generating an indication of knock via the output of one of the two filters while not processing output of the other of the two filters to determine knock; and retarding spark timing via the indication of knock via a controller.

By filtering a rectified and integrated output of a knock sensor via two or more filters that are constructed in parallel, it may be possible to provide the technical result of improving engine knock detection for variable displacement engines. In particular, output of one filter may be directed to an engine knock indicating module when all engine cylinders are combusting fuel. Output of a different filter may be directed to the engine knock indicating module when less than all engine cylinders are combusting fuel. The internal filter states and filter outputs of the two filters are not disrupted by noise that occurs in a knock window of a cylinder when output of the filters is not being used to determine the presence or absence of engine knock. Consequently, the engine background noise levels for different engine operating modes may not be disturbed by other engine operating modes so that when a particular engine operating mode is entered, output of its associated filter may be at an expected level instead of at a level that has been influenced by another engine operating mode.

In this way, it may be possible to improve knock detection for variable displacement engines. In addition, the possibility of generating false indications of engine knock may be reduced. Further, engine fuel economy may be improved when spark is not retarded due to false indications of engine knock.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1A:
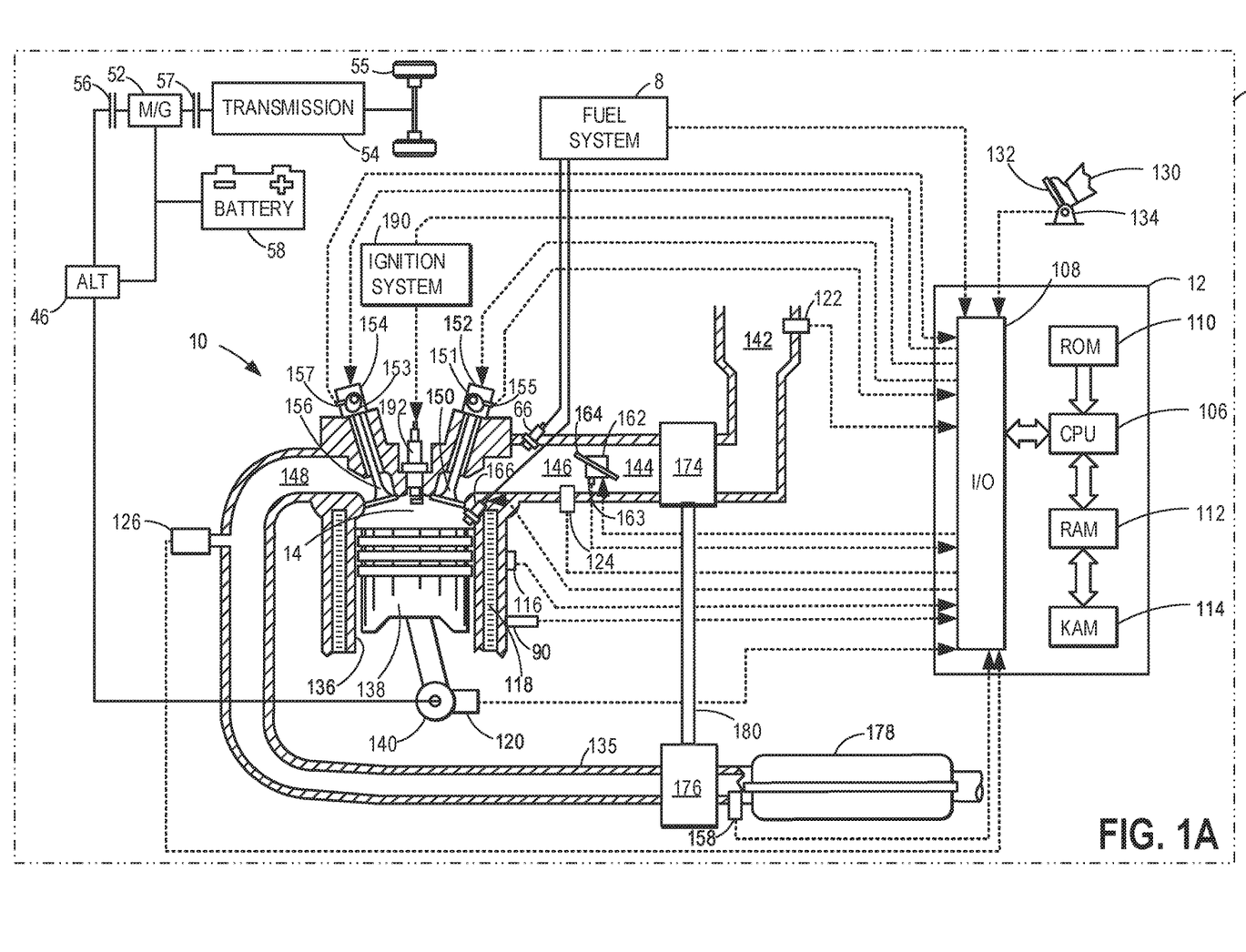
FIG. 1A shows a schematic depiction of an engine system of a vehicle.
Figure 1B:
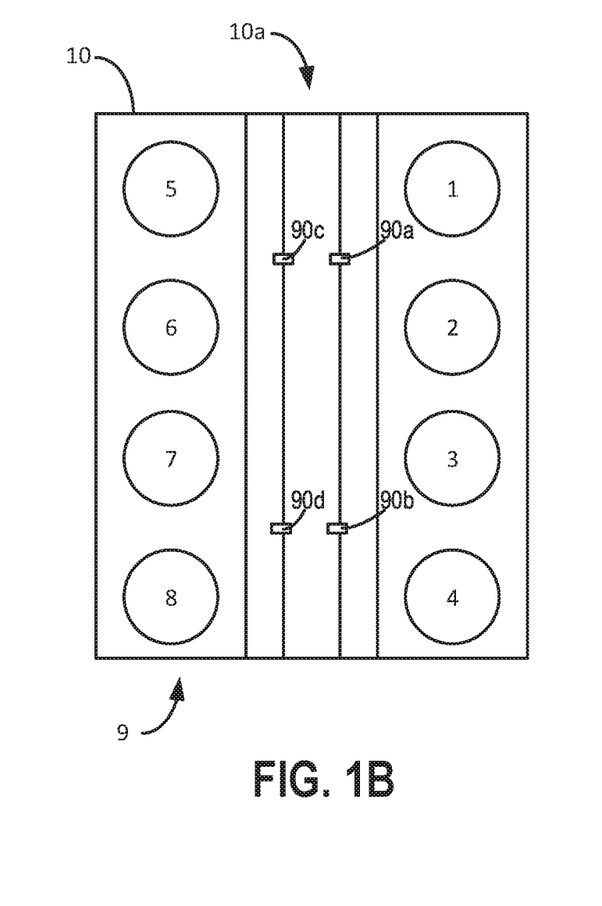
FIG. 1B shows example locations for knock sensors for a V8 engine.
Figure 1C:
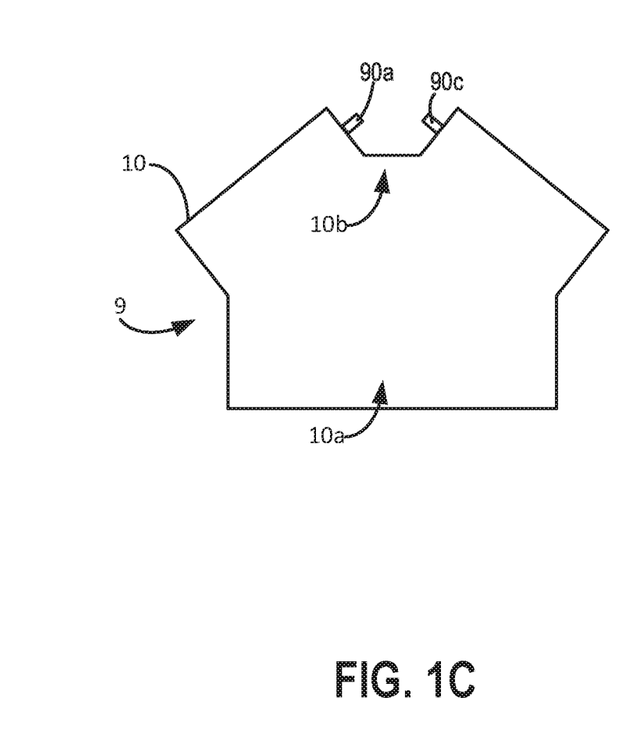
FIG. 1C shows an alternative view of knock sensor locations for the V8 engine.
Figure 2:
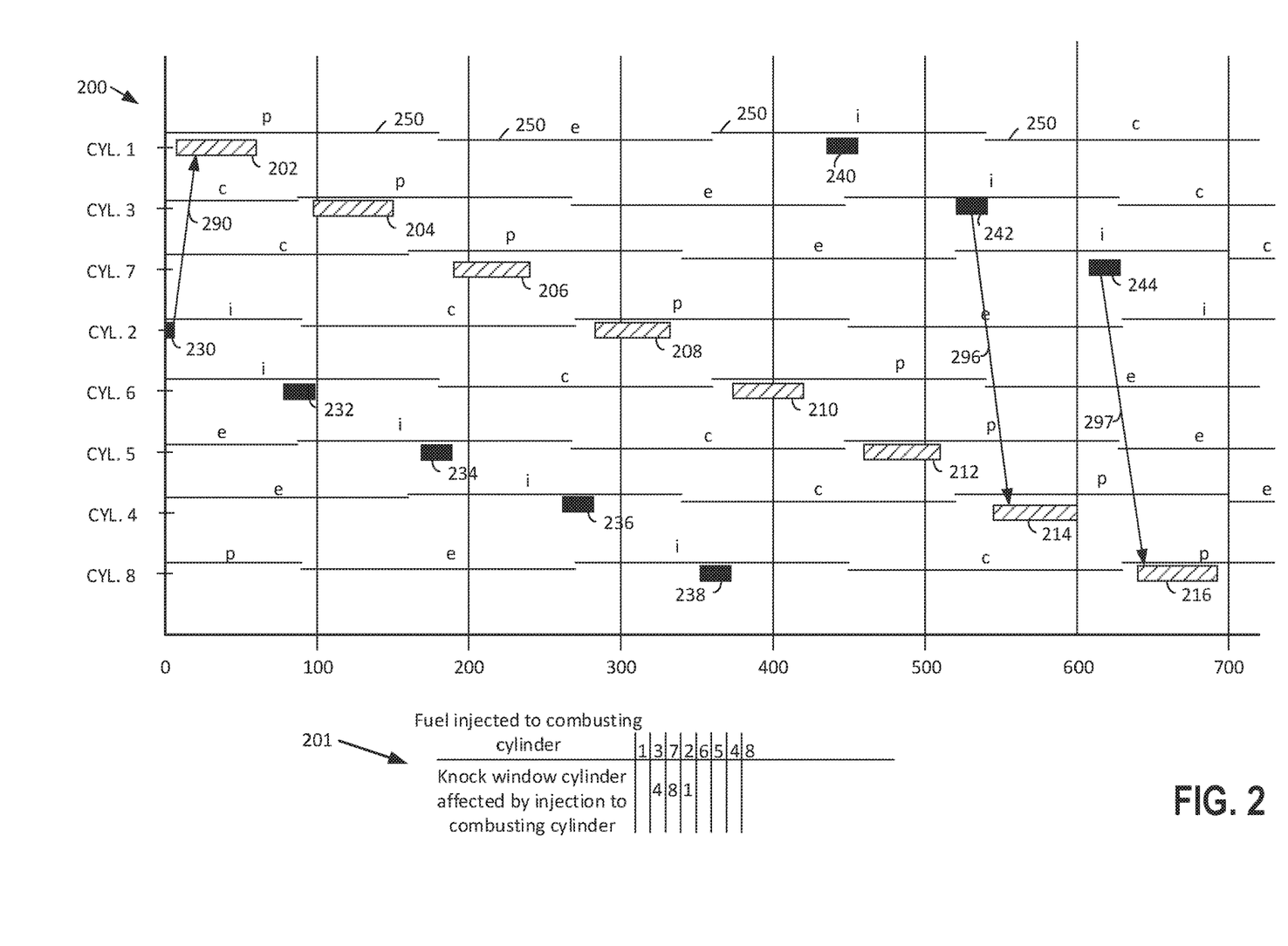
FIG. 2 shows a timing diagram that that illustrates how fuel injection control actions for a few engine cylinders may influence background engine knock noise level for a few different engine cylinders.
Figure 3:
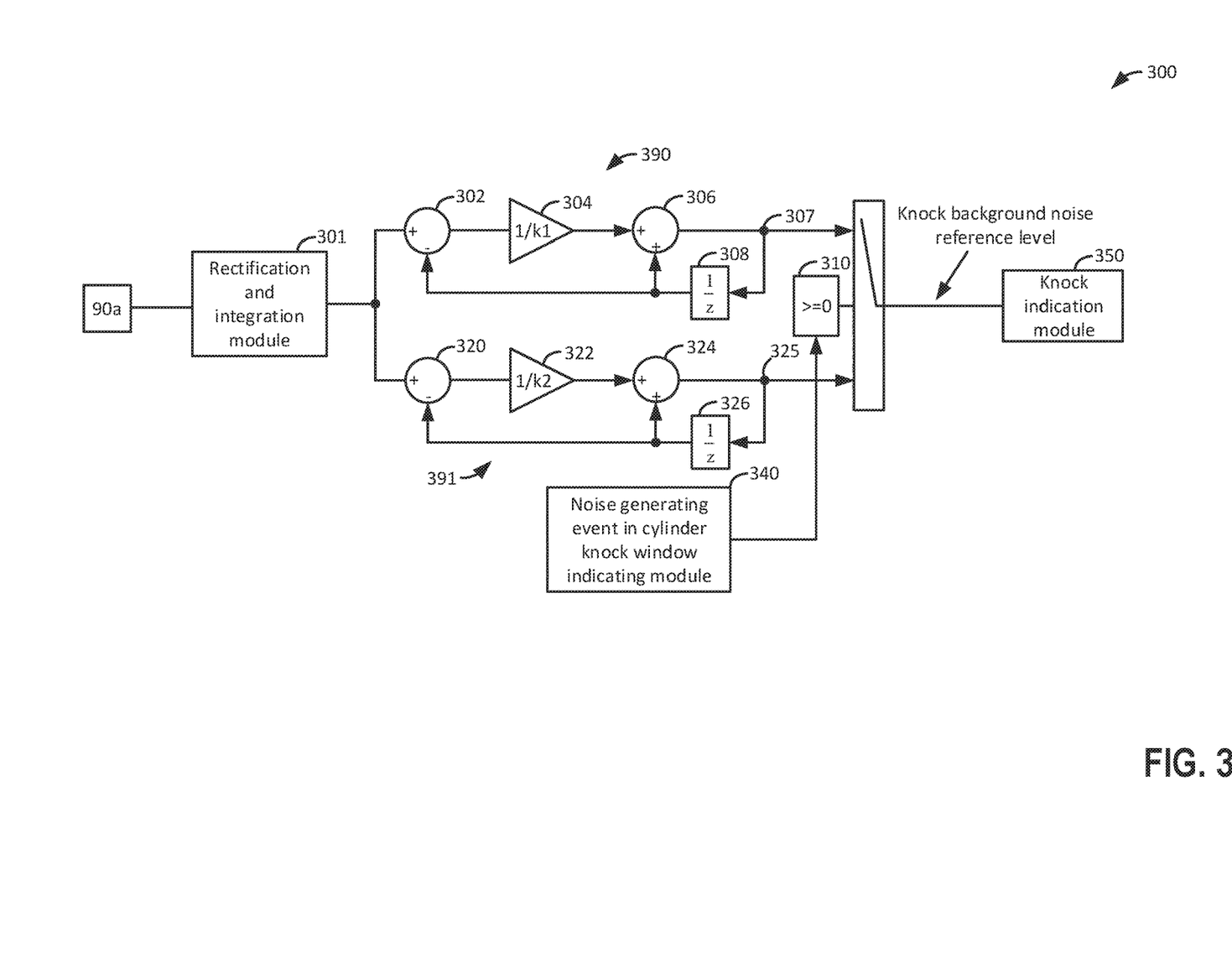
FIG. 3 shows a block diagram of two filters that are constructed in parallel for the purpose of determining engine background noise levels.
Figure 4:
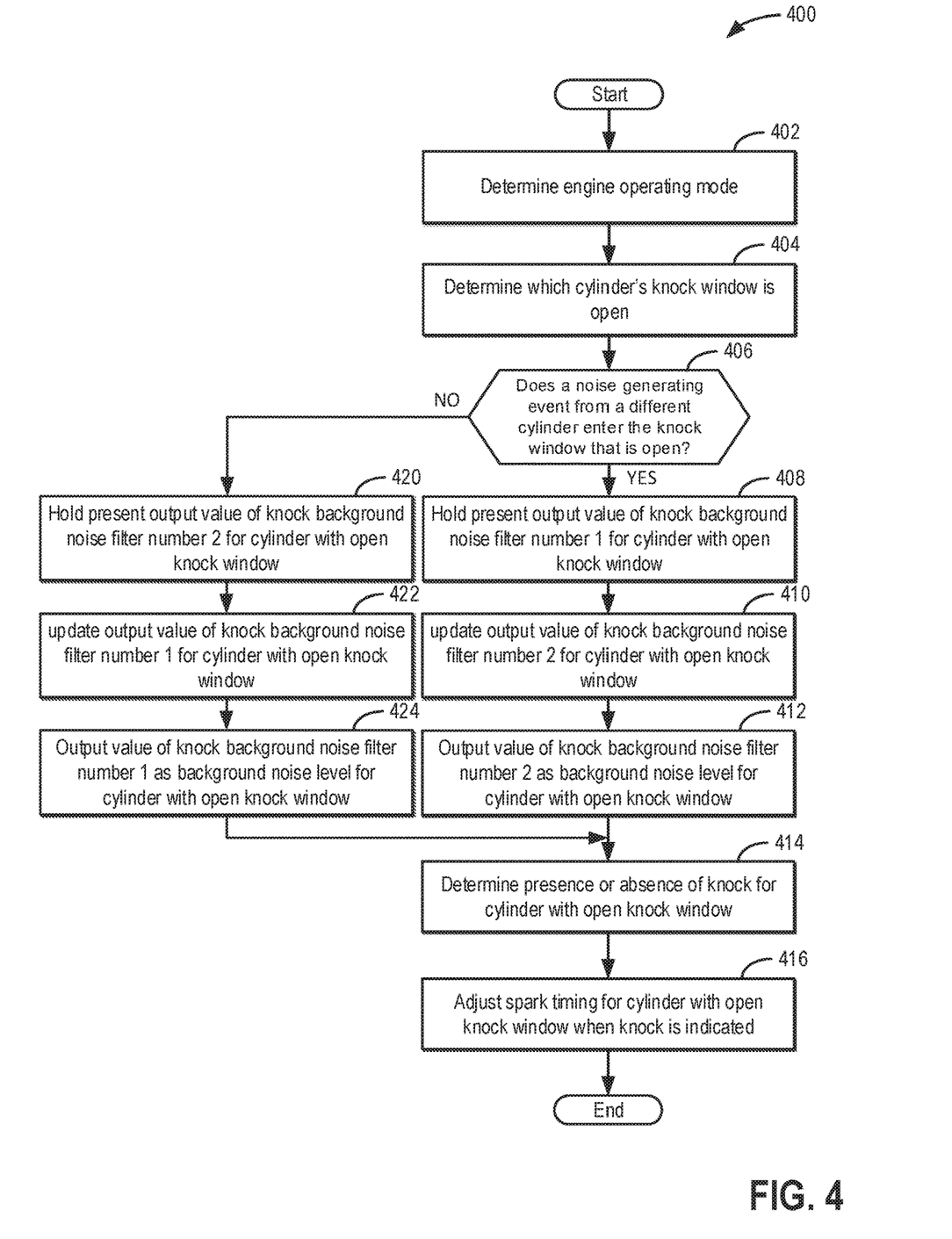
FIG. 4 shows a flow chart of a method for determining engine background noise levels and adjusting engine operation responsive to indications of knock.
Figure 5:
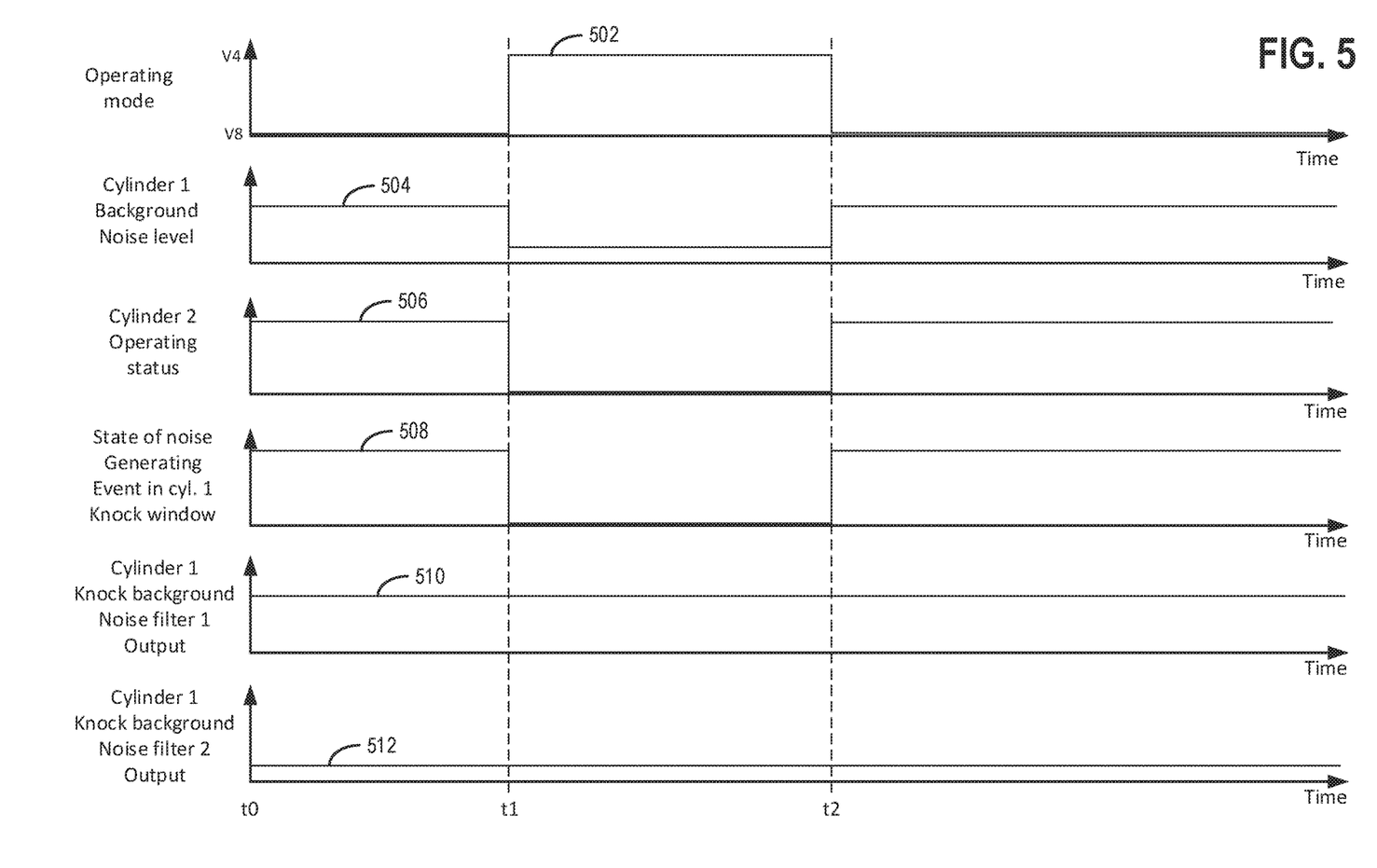
FIG. 5 shows an example engine operating sequence according to the method of FIG. 4.

The following description relates to systems and methods for operating a variable displacement engine (VDE) and controlling and detecting engine knock of the VDE engine. The engine may be of the type that is shown in FIGS. 1A-1C. Timing of engine signals is shown in FIG. 2 to illustrate influence of noise on engine knock background noise levels. The engine system may include filters as shown in FIG. 3 to determine engine knock background noise levels. The engine may be operated according to the method of FIG. 4. An engine operating sequence according to the method of FIG. 4 is shown in FIG. 5.

Turning now to the figures, FIG. 1A depicts an example of a cylinder 14 of an internal combustion engine 10, which may be included in a vehicle 5. Engine 10 may be a variable displacement engine (VDE), as described further below. Engine 10 may be controlled at least partially by a control system, including a controller 12, and by input from a human vehicle operator 130 via an input device 132. In this example, input device 132 includes an accelerator pedal and a pedal position sensor 134 for generating a proportional pedal position signal. Cylinder (herein, also "combustion chamber") 14 of engine 10 may include combustion chamber walls 136 with a piston 138 positioned therein. Piston 138 may be coupled to a crankshaft 140 so that reciprocating motion of the piston is translated into rotational motion of the crankshaft. Crankshaft 140 may be coupled to at least one vehicle wheel 55 of vehicle 5 via a transmission 54, as further described below. Further, a starter motor (not shown) may be coupled to crankshaft 140 via a flywheel to enable a starting operation of engine 10.

In some examples, vehicle 5 may be a hybrid vehicle with multiple sources of torque available to one or more vehicle wheels 55. In other examples, vehicle 5 is a conventional vehicle with only an engine or an electric vehicle with only an electric machine(s). In the example shown, vehicle 5 includes engine 10 and an electric machine 52. Electric machine 52 may be a motor or a motor/generator. Crankshaft 140 of engine 10 and electric machine 52 are connected via transmission 54 to vehicle wheels 55 when one or more clutches 56 are engaged. In the depicted example, a first clutch 56 is provided between crankshaft 140 and electric machine 52, and a second clutch 57 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission.

The powertrain may be configured in various manners, including as a parallel, a series, or a series-parallel hybrid vehicle. In electric vehicle examples, a system battery 58 may be a traction battery that delivers electrical power to electric machine 52 to provide torque to vehicle wheels 55. In some examples, electric machine 52 may also be operated as a generator to provide electrical power to charge system battery 58, for example, during a braking operation. It will be appreciated that in other examples, including non-electric vehicle examples, system battery 58 may be a typical starting, lighting, ignition (SLI) battery coupled to an alternator 46.

Alternator 46 may be configured to charge system battery 58 using engine torque via crankshaft 140 during engine running. In addition, alternator 46 may power one or more electrical systems of the engine, such as one or more auxiliary systems including a heating, ventilation, and air conditioning (HVAC) system, vehicle lights, an on-board entertainment system, and other auxiliary systems based on their corresponding electrical demands. In one example, a current drawn on the alternator may continually vary based on each of an operator cabin cooling demand, a battery charging requirement, other auxiliary vehicle system demands, and motor torque. A voltage regulator may be coupled to alternator 46 in order to regulate the power output of the alternator based upon system usage requirements, including auxiliary system demands.

Cylinder 14 of engine 10 can receive intake air via a series of intake passages 142 and 144 and an intake manifold 146. Intake manifold 146 can communicate with other cylinders of engine 10 in addition to cylinder 14. One or more of the intake passages may include one or more boosting devices, such as a turbocharger or a supercharger. For example, FIG. 1A shows engine 10 configured with a turbocharger, including a compressor 174 arranged between intake passages 142 and 144 and an exhaust turbine 176 arranged along an exhaust passage 135. Compressor 174 may be at least partially powered by exhaust turbine 176 via a shaft 180 when the boosting device is configured as a turbocharger. However, in other examples, such as when engine 10 is provided with a supercharger, compressor 174 may be powered by mechanical input from a motor or the engine and exhaust turbine 176 may be optionally omitted. In still other examples, engine 10 may be provided with an electric supercharger (e.g., an "eBooster"), and compressor 174 may be driven by an electric motor. In still other examples, engine 10 may not be provided with a boosting device, such as when engine 10 is a naturally aspirated engine.

A throttle 162 including a throttle plate 164 may be provided in the engine intake passages for varying a flow rate and/or pressure of intake air provided to the engine cylinders. For example, throttle 162 may be positioned downstream of compressor 174, as shown in FIG. 1A, or may be alternatively provided upstream of compressor 174. A position of throttle 162 may be communicated to controller 12 via a signal from a throttle position sensor.

An exhaust manifold 148 can receive exhaust gases from other cylinders of engine 10 in addition to cylinder 14. An exhaust gas sensor 126 is shown coupled to exhaust manifold 148 upstream of an emission control device 178. Exhaust gas sensor 126 may be selected from among various suitable sensors for providing an indication of an exhaust gas air/fuel ratio (AFR), such as a linear oxygen sensor or UEGO (universal or wide-range exhaust gas oxygen), a two-state oxygen sensor or EGO, a HEGO (heated EGO), a NOx, a HC, or a CO sensor, for example. In the example of FIG. 1A, exhaust gas sensor 126 is a UEGO sensor. Emission control device 178 may be a three-way catalyst, a NOx trap, various other emission control devices, or combinations thereof. In the example of FIG. 1A, emission control device 178 is a three-way catalyst.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder. In this example, intake valve 150 may be controlled by controller 12 by cam actuation via cam actuation system 152, including one or more cams 151. Similarly, exhaust valve 156 may be controlled by controller 12 via cam actuation system 154, including one or more cams 153. The position of intake valve 150 and exhaust valve 156 may be determined by valve position sensors (not shown) and/or camshaft position sensors 155 and 157, respectively.

During some conditions, controller 12 may vary the signals provided to cam actuation systems 152 and 154 to control the opening and closing of the respective intake and exhaust valves. The intake and exhaust valve timing may be controlled concurrently, or any of a possibility of variable intake cam timing, variable exhaust cam timing, dual independent variable cam timing, or fixed cam timing may be used. Each cam actuation system may include one or more cams and may utilize one or more of variable displacement engine (VDE), cam profile switching (CPS), variable cam timing (VCT), variable valve timing (VVT), and/or variable valve lift (VVL) systems that may be operated by controller 12 to vary valve operation. In alternative examples, intake valve 150 and/or exhaust valve 156 may be controlled by electric valve actuation. For example, cylinder 14 may alternatively include an intake valve controlled via electric valve actuation and an exhaust valve controlled via cam actuation, including CPS and/or VCT systems. In other examples, the intake and exhaust valves may be controlled by a common valve actuator (or actuation system) or a variable valve timing actuator (or actuation system).

As further described herein, intake valve 150 and exhaust valve 156 may be deactivated during VDE mode via electrically actuated rocker arm mechanisms. In another example, intake valve 150 and exhaust valve 156 may be deactivated via a CPS mechanism in which a cam lobe with no lift is used for deactivated valves. Still other valve deactivation mechanisms may also be used, such as for electrically actuated valves. In one example, deactivation of intake valve 150 may be controlled by a first VDE actuator (e.g., a first electrically actuated rocker arm mechanism, coupled to intake valve 150) while deactivation of exhaust valve 156 may be controlled by a second VDE actuator (e.g., a second electrically actuated rocker arm mechanism, coupled to exhaust valve 156). In alternate examples, a single VDE actuator may control deactivation of both intake and exhaust valves of the cylinder. In still other examples, a single cylinder valve actuator deactivates a plurality of cylinders (both intake and exhaust valves), such as all of the cylinders in an engine bank, or a distinct actuator may control deactivation for all of the intake valves while another distinct actuator controls deactivation for all of the exhaust valves of the deactivated cylinders. It will be appreciated that if the cylinder is a non-deactivatable cylinder of the VDE engine, then the cylinder may not have any valve deactivating actuators. Each engine cylinder may include the valve control mechanisms described herein. Intake and exhaust valves are held in closed positions over one or more engine cycles when deactivated so as to prevent flow into or out of cylinder 14.

Cylinder 14 can have a compression ratio, which is a ratio of volumes when piston 138 is at bottom dead center (BDC) to top dead center (TDC). In one example, the compression ratio is in the range of 9:1 to 10:1. However, in some examples where different fuels are used, the compression ratio may be increased. This may happen, for example, when higher octane fuels or fuels with a higher latent enthalpy of vaporization are used. The compression ratio may also be increased if direct injection is used due to its effect on engine knock.

Each cylinder of engine 10 may include a spark plug 192 for initiating combustion. An ignition system 190 can provide an ignition spark to combustion chamber 14 via spark plug 192 in response to a spark advance signal from controller 12, under select operating modes. Spark timing may be adjusted based on engine operating conditions and driver torque demand. For example, spark may be provided at minimum spark advance for best torque (MBT) timing to maximize engine power and efficiency. Controller 12 may input engine operating conditions, including engine speed, engine load, and exhaust gas AFR, into a look-up table and output the corresponding MBT timing for the input engine operating conditions. In other examples, spark may be retarded from MBT, such as to expedite catalyst warm-up during engine start or to reduce an occurrence of engine knock.

In some examples, each cylinder of engine 10 may be configured with one or more fuel injectors for providing fuel thereto. As a non-limiting example, cylinder 14 is shown including a direct fuel injector 166 and a port fuel injector 66. Fuel injectors 166 and 66 may be configured to deliver fuel received from a fuel system 8. Fuel system 8 may include one or more fuel tanks, fuel pumps, and fuel rails. Fuel injector 166 is shown coupled directly to cylinder 14 for injecting fuel directly therein in proportion to a pulse width of a signal received from controller 12. Port fuel injector 66 may be controlled by controller 12 in a similar way. In this manner, fuel injector 166 provides what is known as direct injection (hereafter also referred to as "DI") of fuel into cylinder 14. While FIG. 1A shows fuel injector 166 positioned to one side of cylinder 14, fuel injector 166 may alternatively be located overhead of the piston, such as near the position of spark plug 192. Such a position may increase mixing and combustion when operating the engine with an alcohol-based fuel due to the lower volatility of some alcohol-based fuels. Alternatively, the injector may be located overhead and near the intake valve to increase mixing. Fuel may be delivered to fuel injectors 166 and 66 from a fuel tank of fuel system 8 via fuel pumps and fuel rails. Further, the fuel tank may have a pressure transducer providing a signal to controller 12.

Fuel injectors 166 and 66 may be configured to receive different fuels from fuel system 8 in varying relative amounts as a fuel mixture and further configured to inject this fuel mixture directly into cylinder. For example, fuel injector 166 may receive alcohol fuel and fuel injector 66 may receive gasoline. Further, fuel may be delivered to cylinder 14 during different strokes of a single cycle of the cylinder. For example, directly injected fuel may be delivered at least partially during a previous exhaust stroke, during an intake stroke, and/or during a compression stroke. Port injected fuel may be injected after intake valve closing of a previous cycle of the cylinder receiving fuel and up until intake valve closing of the present cylinder cycle. As such, for a single combustion event (e.g., combustion of fuel in the cylinder via spark ignition), one or multiple injections of fuel may be performed per cycle via either or both injectors. The multiple DI injections may be performed during the compression stroke, intake stroke, or any appropriate combination thereof in what is referred to as split fuel injection.

Fuel tanks in fuel system 8 may hold fuels of different fuel types, such as fuels with different fuel qualities and different fuel compositions. The differences may include different alcohol content, different water content, different octane, different heats of vaporization, different fuel blends, and/or combinations thereof, etc. One example of fuels with different heats of vaporization includes gasoline as a first fuel type with a lower heat of vaporization and ethanol as a second fuel type with a greater heat of vaporization. In another example, the engine may use gasoline as a first fuel type and an alcohol-containing fuel blend, such as E85 (which is approximately 85% ethanol and 15% gasoline) or M85 (which is approximately 85% methanol and 15% gasoline), as a second fuel type. Other feasible substances include water, methanol, a mixture of alcohol and water, a mixture of water and methanol, a mixture of alcohols, etc. In still another example, both fuels may be alcohol blends with varying alcohol compositions, wherein the first fuel type may be a gasoline alcohol blend with a lower concentration of alcohol, such as E1i) (which is approximately 10% ethanol), while the second fuel type may be a gasoline alcohol blend with a greater concentration of alcohol, such as E85 (which is approximately 85% ethanol). Additionally, the first and second fuels may also differ in other fuel qualities, such as a difference in temperature, viscosity, octane number, etc. Moreover, fuel characteristics of one or both fuel tanks may vary frequently, for example, due to day to day variations in tank refilling.

Controller 12 is shown in FIG. 1A as a microcomputer, including a microprocessor unit 106, input/output ports 108, an electronic storage medium for executable programs (e.g., executable instructions) and calibration values shown as non-transitory read-only memory chip 110 in this particular example, random access memory 112, keep alive memory 114, and a data bus. Controller 12 may receive various signals from sensors coupled to engine 10, including signals previously discussed and additionally including a measurement of inducted mass air flow (MAF) from a mass air flow sensor 122; an engine coolant temperature (ECT) from a temperature sensor 116 coupled to a cooling sleeve 118; an exhaust gas temperature from a temperature sensor 158 coupled to exhaust passage 135; a crankshaft position signal from a Hall effect sensor 120 (or other type) coupled to crankshaft 140; throttle position from a throttle position sensor 163; signal UEGO from exhaust gas sensor 126, which may be used by controller 12 to determine the air-fuel ratio of the exhaust gas; engine vibrations (e.g., knock) via knock sensor 90; and an absolute manifold pressure signal (MAP) from a MAP sensor 124. An engine speed signal, RPM, may be generated by controller 12 from crankshaft position. The manifold pressure signal MAP from MAP sensor 124 may be used to provide an indication of vacuum or pressure in the intake manifold. Controller 12 may infer an engine temperature based on the engine coolant temperature and infer a temperature of emission control device 178 based on the signal received from temperature sensor 158.

Controller 12 receives signals from the various sensors of FIG. 1A and employs the various actuators of FIG. 1A to adjust engine operation based on the received signals and instructions stored on a memory of the controller. For example, the controller may transition the engine to operating in VDE mode by actuating valve actuators 152 and 154 to deactivate selected cylinders, as further described with respect to FIG. 5.

As described above, FIG. 1A shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1A with reference to cylinder 14.

During selected conditions, such as when the full torque capability of engine 10 is not requested, one of a first or a second cylinder group may be selected for deactivation by controller 12 (herein also referred to as a VDE mode of operation). During the VDE mode, cylinders of the selected group of cylinders may be deactivated by shutting off respective fuel injectors 166 and 66. Further, valves 150 and 156 may be deactivated and held closed over one or more engine cycles. While fuel injectors of the disabled cylinders are turned off, the remaining enabled cylinders continue to carry out combustion, with corresponding fuel injectors and intake and exhaust valves active and operating. To meet torque requirements, the controller adjusts the amount of air entering active engine cylinders. Thus, to provide equivalent engine torque that an eight cylinder engine produces at 0.2 engine load and a particular engine speed, the active engine cylinders may operate at higher pressures than engine cylinders when the engine is operated with all engine cylinders being active. This requires higher manifold pressures, resulting in lowered pumping losses and increased engine efficiency. Additionally, the lower effective surface area (from only the active cylinders) exposed to combustion reduces engine heat losses, increasing the thermal efficiency of the engine.

Referring now to FIG. 1B, a plan view of engine 10 is shown. Front 10a of engine 10 may include a front end accessory drive (FEAD) (not shown) to provide power to an alternator, power steering system, and air conditioning compressor. In this example, engine 10 is shown in a V8 configuration with eight cylinders that are numbered 1-8. Engine knock may be sensed via four knock sensors 90a-90d. The knock sensors are positioned in the valley of engine block 9. In this example, output of knock sensor 90a is sampled via controller 12 during the knock windows of engine cylinders 1 and 2. Output of knock sensor 90b is sampled via controller 12 during the knock windows of engine cylinders 3 and 4. Output of knock sensor 90c is sampled via controller 12 during the knock windows of engine cylinders 5 and 6. Output of knock sensor 90c is sampled via controller 12 during the knock windows of engine cylinders 7 and 8. The plurality of knock sensors improves the ability to detect knock for each cylinder since attenuation of engine vibrations from knock increases as the distance from the knocking cylinder to the knock sensor increases.

Referring now to FIG. 1C, a front view of engine 10 is shown. Engine block 9 includes a valley 10b where engine knock sensors 90a and 90c are mounted to block 9. By mounting knock sensors 90a and 90c in the valley 10b, a good signal to noise ratio may be available so that knock may be more reliably detected. However, the mounting locations of knock sensors 90a-90d may also allow some fuel injector control actions to be observed by some sensors and not by others. Thus, background noise levels of some cylinders may be higher or lower than other cylinders. Additionally, the distance of a fuel injector that opens or closes near a knock window of another engine cylinder may affect an amount of time that it takes for a vibration to travel from the operating fuel injector to the knock sensor. And, a longer time for the vibration to travel from the fuel injector to the knock sensor may allow the vibration to enter a knock window for a cylinder. As such, knock sensor location, firing order, and engine configuration may also affect engine knock background noise levels for some engine cylinders.

Referring now to FIG. 2, a timing sequence 200 that shows example engine knock background noise window timing is shown. The illustrated timings are for an eight cylinder engine that has a firing order of 1-3-7-2-6-5-4-8. The engine is a four stroke engine that has a cycle of 720 crankshaft degrees. The engine crankshaft degrees are located along the horizontal axis and zero degrees represents top-dead-center compression stroke for cylinder number one. The eight cylinders are labeled along the vertical axis.

The engine knock window for cylinder number one is indicated by slash bar 202. Knock windows for the remaining engine cylinders (2-8) are indicated by similar slash bars (204-216) that align with labeling along the vertical axis. Solid bar 230 represents a DI fuel injector open interval for cylinder number two. The DI fuel injector for cylinder number two is closed when solid bar 230 is not visible. The DI fuel injector for cylinder number two opens at the left side of solid bar 230 and closes at the right side of solid bar 230. DI fuel injections for the remaining engine cylinders (2-8) are indicated by similar solid bars (232-244) and they follow the same convention as solid bar 330. The fuel injector bars 230-244 respectively align with cylinders listed along the vertical axis that the fuel injector bars correspond to.

Strokes for cylinder number one are indicated by horizontal lines 250. Letters p, e, i, and c identify the power (p), exhaust (e), intake (i), and compression (c) strokes associated with cylinder number one. Strokes for the other engine cylinders are identified in a similar way.

FIG. 2 also includes table 201 that describes the relationship between DI fuel injection for one cylinder and engine knock background noise level for another cylinder as is illustrated in sequence 200. Table 201 includes a first label that indicates to which cylinder fuel is injected for combustion. The engine cylinder numbers arranged in the engine's firing order 1-3-7-2-6-5-4-8. The second label indicates the knock window of the cylinder that is affected by fuel injection to the cylinders combusting. Table 201 shows that the knock window of cylinder 4 is affected by injection of fuel that combusts in cylinder 3 (cylinder 3 is located above cylinder 4 in the table). Table 201 also shows that the knock window of cylinder 8 is affected by injection of fuel that is combusted in cylinder 7. Finally, the knock window of cylinder 1 is affected by injection of fuel that is combusted in cylinder 2. Thus, in this example, not all cylinder knock windows are affected by injection of fuel into other engine cylinders. Only knock windows of three cylinders have noise levels that are affected by injector control actions.

Thus, it may be observed that it is desirable to have engine knock background noise levels for each engine cylinder so that cylinders that are affected by poppet valve closings or fuel injector opening and closing may be compensated at the onset of a VDE mode change. The engine knock background noise levels may be stored in controller memory and retrieved at the beginning of a VDE mode change so that engine knock assessments may be made more reliable.

Referring now to FIG. 3, a block diagram of two digital filters that have been constructed in parallel is shown. The filters are used to determine engine knock background noise levels for one engine cylinder. The filters shown in FIG. 3 may be incorporated into and cooperate with controller 12 shown in FIG. 1A as executable instructions stored in non-transitory memory. Further, the filters shown in FIG. 3 may be incorporated into the method of FIG. 4. Controller 12 may include a plurality of dual digital filters as is shown in FIG. 3, one pair of digital filters for each engine cylinder. Further, although FIG. 3 shows two digital filters constructed in parallel, three, four, or any number greater than one digital filters may be constructed in parallel to determine engine knock background noise levels during the various engine operating modes. One filter may provide an engine background noise level when all engine cylinders are operating; another filter may provide the engine background noise level when fuel injector control actions (e.g., opening and/or closing) generate noise within a knock window of a cylinder; and another filter may provide the engine background noise level when a cylinder poppet valve generates noise within a knock window of a cylinder, and so on.

Output of knock sensor 90a is processed via module 301 (e.g., software and/or hardware). Module 301 rectifies and integrates an output signal of knock sensor 90a. In one example, the signal may be rectified by taking the absolute value of the knock sensor signal. The integrated and rectified signal is input to first digital filter 390 and second digital filter 391. First digital filter 390 is comprised of summing junction 302, time constant scaler 304, summing junction 306 and unit time delay 308. Second digital filter 391 is comprised of summing junction 320, time constant scaler 322, summing junction 324 and unit time delay 326. The digital filters outputs are at junctions 307 and 325. The two digital filters may be described by the following equations:

$$Y1(k) = \left[(x - Y1(k-1)) \cdot \frac{1}{k1}\right] + Y1(k-1)$$

$$Y2(k) = \left[(x - Y2(k-1)) \cdot \frac{1}{k2}\right] + Y2(k-1)$$

where Y1(k) is the output of the first digital filter 390, k is the event number, x is the input value to the first digital filter (e.g., the integrated and rectified knock sensor output), (k−1) is one event in the past, k1 is a time constant of the first digital filter 390, Y2(k) is the output of the first digital filter 391, and k2 is a time constant of the second digital filter 391. The internals states of the filter are the Y1(k−1) and Y2(k−1) values. The internal states and the outputs of each filter are held constant at their values when their outputs are not directed to knock indication module 350 for processing.

In this example, switch 310 is positioned to direct the output of first filter 390 to knock indication module 350 for processing so although the output of module 301 is directed to and in communication with summing junction 302 and summing junction 320, only the output of summing junction 302 is influenced by the output of module 301. In particular, the output of summing junction 320 is held constant and the output of summing junction 302 is direct to time constant scalar 304 where the output of summing junction 302 is multiplied by 1/k1. The output of summing junction 302 is equal to the last output value (e.g., for the last knock window of the cylinder) of the first digital filter Y1(k−1) plus the output of module 301. The output of 304 is then directed to summing junction 306 where it is added to the last output of the first digital filter Y1(k−1). The output of summing junction 306 is the new output for first digital filter 390 for the present engine knock window of the cylinder. The output of first filter 390 is isolated from and not in communication with the output of second filter 391.

Block 340 outputs a value of one when a noise generating event occurs in a knock window for the present cylinder being evaluated for knock. Each engine cylinder is evaluated for knock during a knock window of the cylinder. In one example, the knock window timing for the cylinder being evaluated is from five crankshaft degrees after top-dead-center compression stroke of the cylinder being evaluated for knock to sixty degrees after top-dead-center compression stoke of the cylinder being evaluated for knock. In other examples, the knock windows may have other timings. Block 340 may include logic to determine when poppet valves of engine cylinders open and close during an engine cycle as well as logic to determine when fuel injectors (e.g., port and DI) open and close during the engine cycle. If a poppet valve opening or closing of another cylinder occurs during a knock window of the cylinder being evaluated for knock, block 340 outputs a value of one during an engine cycle. Likewise, if a fuel injector of another cylinder opens or closes occurs during a knock window of the cylinder being evaluated for knock, block 340 outputs a value of one. If a poppet valve opening or closing event or a fuel injector opening or closing event does not take place during the knock window of the cylinder being evaluated for knock, block 340 outputs a value of zero. Switch 310 directs the output of filter number two 391 to knock indication model 350 when the output of block 340 is equal to one. Switch 310 directs the output of filter number one 390 to knock indication model 350 when the output of block 340 is equal to zero.

At block 350, an assessment of whether or not knock should be indicated for the cylinder being evaluated for knock based on the engine knock background noise levels is made. In one example, a knock intensity value is computed for the cylinder being evaluated for knock by integrating output of the knock sensor during the knock window of the particular cylinder and dividing the integrated knock sensor output by the output of switch 310 (e.g., integrated engine knock background noise level for the cylinder being evaluated for knock). If the knock intensity value exceeds a threshold value (e.g., 1 volt), then knock is indicated for the particular cylinder and spark timing for the particular cylinder is retarded by a predetermined amount. Alternatively, or in addition, fuel injection start of injection timing for the DI injector may be adjusted earlier or later to improve charge cooling. The spark is retarded for the particular cylinder and then the spark timing is advanced back toward the MBT (minimum spark advance for best engine torque) spark timing. For example, if the knock intensity value for cylinder number one exceeds a threshold level, then knock is indicated for cylinder number one and spark timing of cylinder number one is retarded by five crankshaft degrees. The spark timing for cylinder number one may be advanced by five crankshaft degrees within ten seconds of when the spark timing of cylinder number one was retarded based on knock. If knock is not indicated, spark timing for the cylinder remains at its requested or base timing (e.g., MBT timing). Knock for each cylinder may be determined in this way.

Thus, the output of the two filters may be applied at different times depending on engine operating mode to determine the presence or absence of engine knock. Further, output and internal states of a filter that is not used to determine engine knock during an engine cycle are held at their last value (e.g., a last value of when output of the filter when the filter was used to determine the presence or absence of engine knock). This allows each of the filters to maintain states that are representative for a particular mode of engine operating so that when the engine reenters the mode of operation, the filter outputs a value that may be used to reliably determine the presence or absence of engine knock.

Referring now to FIG. 4, a method for operating a VDE engine is shown. The method of FIG. 4 may be included in and may cooperate with the system of FIGS. 1A-3. At least portions of method 400 may be incorporated in the system of FIGS. 1A-3 as executable instructions stored in non-transitory memory. In addition, other portions of method 400 may be performed via a controller transforming operating states of devices and actuators in the physical world. The controller may employ engine actuators of the engine system to adjust engine operation. Further, method 400 may determine selected control parameters from sensor inputs. The first and second digital filters described in method 400 are the same filters that are discussed in the description of FIG. 4.

At 402, method 400 determines vehicle and engine operating conditions via the sensors described in FIGS. 1A-1C. Method 400 may determine operating conditions including but not limited to engine speed, engine load, engine temperature, ambient temperature, fuel injection timing, knock sensor output, fuel injection timing for DI and port injectors, engine position, poppet valve opening and closing timing, and engine air flow. Method 400 proceeds to 404.

At 404, method 400 provides an output (e.g., a change in state of a variable that represents that the engine is at a position within a knock window, or crankshaft interval, where the presence or absence of knock is evaluated for a particular engine cylinder) that is associated with a particular engine cylinder to indicate that the engine is at a position where a knock window for a particular cylinder is open (e.g., a crankshaft angular region where the presence or absence of engine knock is evaluated for the particular cylinder). Method 400 provides a unique output for each engine cylinder to indicate when the knock window of each engine cylinder is open. The state of the output may be determined from retrieving knock window timing for each engine cylinder from controller memory. In one example, the knock window timing for the selected cylinder is from five crankshaft degrees after top-dead-center compression stroke of the selected cylinder to sixty degrees after top-dead-center compression stoke of the selected cylinder. In other examples, the knock windows may have other timings (e.g., knock and knock background noise are assessed for the selected cylinder during the crankshaft interval of the knock window for the selected cylinder). The controller also samples output of a knock sensor while the knock window is open. Method 400 proceeds to 406.

At 406, method 400 judges if a noise generating event associated with a different cylinder than the cylinder for which engine position is in a knock window interval is present. For example, if the engine position is within a crankshaft interval of the knock window for cylinder number four and a fuel injector of cylinder number three opens or closes during the knock window of cylinder number four to generate engine vibration, then the answer is yes and method 400 proceeds to 408. Otherwise, the answer is no and method 400 proceeds to 420. As previously discussed, the noise generating event may be a poppet valve opening or closing or some other event that induces an engine vibration.

At 408, method 400 holds the present output value or state and the internal states of the first engine knock background noise filter (e.g., 390) at their present values for the cylinder with the open knock window (e.g., when engine position is within a knock interval of a cylinder). For example, if method 400 judges that engine position is within the knock window crankshaft interval for cylinder number three, then the values Y1 and Y1(k−1) for the cylinder number three are maintained at their present value. Thus, the values of Y1 and Y1(k−1) are held constant. Method 400 proceeds to 410.

At 410, method 400 updates the output and internal states of the second engine knock background noise filter (e.g., 391) for the cylinder with the open knock window. For example, if method 400 judges that engine position is within the knock window crankshaft interval for cylinder number three, then the values Y2 and Y2(k−1) for the cylinder number three are updated using the present knock sensor output that has been integrated and rectified. Thus, the values of Y2 and Y2(k−1) are revised based on the input x. Method 400 proceeds to 412.

At 412, method 400 delivers the output of the second digital filter (e.g., the knock background noise level for the cylinder having the open knock window) to a knock indication module. This may be accomplished by adjusting a state of a switch (e.g., 310) to allow output of the second digital filter to pass to the knock indication module. The state of the switch may be controlled such that the switch passes output of the second digital filter to step 414 when a noise generating event occurs in a knock window for the present cylinder being evaluated for knock. Each engine cylinder is evaluated for knock during a knock window of the cylinder. If a poppet valve opening or closing of another cylinder occurs during a knock window of the cylinder being evaluated for knock, then output of the second digital filter is passed to step 414. Likewise, if a fuel injector of another cylinder opens or closes occurs during a knock window of the cylinder being evaluated for knock, then output of the second digital filter is passed to step 414.

At 414, method 400 assesses whether or not knock should be indicated for a particular cylinder based on the engine knock background noise levels. In one example, method 400 computes a knock intensity value for a particular cylinder by integrating output of the knock sensor during the knock window of the particular cylinder and dividing the integrated knock sensor output by the filtered integrated engine knock background noise level (e.g., output of step 412) for the particular cylinder. If the knock intensity value exceeds a threshold value (e.g., 1 volt), then knock is indicated for the particular cylinder and spark timing for the particular cylinder is retarded by a predetermined amount. If the knock intensity value does not exceed the threshold level, a knock indication is not provided for the present cylinder during the present engine cycle. Method 400 proceeds to 416.

At 416, method 400 retards spark timing for the particular cylinder in which knock is indicated. After spark timing for the cylinder has been retarded, then the spark timing is advanced back toward the MBT (minimum spark advance for best engine torque) spark timing. For example, if the knock intensity value for cylinder number one exceeds a threshold level, then knock is indicated for cylinder number one and spark timing of cylinder number one is retarded by five crankshaft degrees. The spark timing for cylinder number one may be advanced by five crankshaft degrees within ten seconds of when the spark timing of cylinder number one was retarded based on knock. If knock is not indicated, spark timing for the cylinder remains at its requested or base timing (e.g., MBT timing). Knock for each cylinder may be determined in this way. In addition, method 400 may advance or retard start if fuel injection timing for the cylinder in which knock is indicated to increase cylinder charge cooling. Method 400 proceeds to exit.

At 420, method 400 holds the present output value or state and the internal states of the second engine knock background noise filter (e.g., 391) at their present values for the cylinder with the open knock window (e.g., when engine position is within a knock interval of a cylinder). For example, if method 400 judges that engine position is within the knock window crankshaft interval for cylinder number three, then the values Y2 and Y2(k−1) for the cylinder number three are maintained at their present value. Thus, the values of Y2 and Y2(k−1) are held constant. Method 400 proceeds to 422.

At 422, method 400 updates the output and internal states of the first engine knock background noise filter (e.g., 390) for the cylinder with the open knock window. For example, if method 400 judges that engine position is within the knock window crankshaft interval for cylinder number three, then the values Y1 and Y1(k−1) for the cylinder number three are updated using the present knock sensor output that has been integrated and rectified. Thus, the values of Y1 and Y1(k−1) are revised based on the input x. Method 400 proceeds to 424.

At 424, method 400 delivers the output of the first digital filter (e.g., the knock background noise level for the cylinder having the open knock window) to a knock indication module. This may be accomplished by adjusting a state of a switch (e.g., 310) to allow output of the first digital filter to pass to the knock indication module. The state of the switch may be controlled such that the switch passes output of the second digital filter to step 414 when a noise generating event occurs in a knock window for the present cylinder being evaluated for knock. Each engine cylinder is evaluated for knock during a knock window of the cylinder. If a poppet valve opening or closing of another cylinder occurs during a knock window of the cylinder being evaluated for knock, then output of the second digital filter is passed to step 414. Likewise, if a fuel injector of another cylinder opens or closes occurs during a knock window of the cylinder being evaluated for knock, then output of the second digital filter is passed to step 414.

Thus, method 400 adjusts the states of digital filters as shown in FIG. 3 based on whether or not noise indicating events take place in the knock window of the cylinder being evaluated for knock. Each engine cylinder may be evaluated for the presence or absence of knock via the method of FIG. 4.

The method of FIG. 4 provides for an engine operating method, comprising: inputting a rectified and integrated knock sensor output signal into two filters that are constructed in parallel; and generating an indication of knock via the output of one of the two filters while not processing output of the other of the two filters to determine knock; and retarding spark timing via the indication of knock via a controller. The method includes where the two filters are digital filters incorporated into the controller. The method further comprises a first filter time constant associated with one of the two filters and a second filter time constant associated with the other of the two filters. The method further comprises adjusting a state of a switch to communicate output of the one of the two filters to a knock indicating module during a first condition of an engine, and adjusting the state of the switch to communicate output of the other of the two filters to the knock indicating module during a second condition of the engine. The method further comprises rectifying and integrating output of a knock sensor to produce the rectified and integrated knock sensor output signal, the output of the knock sensor sampled during a knock window of a first cylinder. The method further comprises directing output of the one filter derived from output of the knock sensor sampled during the knock window of the first cylinder responsive to an operating state of a device that controls flow of a fluid into a second cylinder. The method includes where the fluid is air and where the device is a poppet valve. The method includes where the fluid is fuel and where the device is a fuel injector.

The method of FIG. 4 also provides for an engine operating method, comprising: selectively supplying output of a first digital filter and a second digital filter to a knock indicating module via a controller, the first digital filter constructed in parallel with the second digital filter, where output of the first digital filter supplied to the knock indicating module when output of the second digital filter is not output to the knock indicating module, and where output of the first digital filter is supplied to the knock indicating module based on a presence of a noise generating event associated with a first cylinder occurring within a knock window of a second cylinder; and adjusting an engine actuator via the controller responsive to output of the knock indicating module. The method includes where the noise generating event is an opening or a closing of a fuel injector. The method includes where the noise generating event is a closing of a poppet valve. The method includes where the engine actuator is an ignition system. The method includes where the output of the knock indicating module is an indication of knock.

Referring now to FIG. 5, an example sequence that illustrates selectively applying outputs of distinct digital filters that represent engine knock background noise levels for an engine cylinder to determine engine knock is shown. The sequence of FIG. 5 may be provided via the system of FIGS. 1A-1C and FIG. 3 in cooperation with the method of FIG. 4. In this example, the engine is a four stroke V8 engine. The vertical lines at time t1 and t2 represent times of interest in the sequence.

The first plot from the top of FIG. 5 is a plot of engine operating mode versus time. The vertical axis represents engine operating mode and the engine operating modes are identified by labels along the vertical axis. Trace 502 represents the engine operating mode. The horizontal axis represents time and time increases from the left side of the plot to the right side of the plot. V8 indicates that the engine is operating with all eight of its cylinders and all injectors supplying fuel to engine cylinders. V4 indicates that the engine is operating with only four cylinders being active during an engine cycle and fuel is being injected only to active engine cylinders.

The second plot from the top of FIG. 5 is a plot of engine knock background noise level for cylinder number one versus time. The vertical axis represents engine knock background noise level for cylinder number one and the engine knock background noise level for cylinder number one increases in the direction of the vertical axis arrow. Trace 504 represents the engine knock background noise level for cylinder number one. The horizontal axis represents time and time increases from the left side of the plot to the right side of the plot.

The third plot from the top of FIG. 5 is a plot of the operating status of engine cylinder number two versus time. The vertical axis represents the operating status of cylinder number two. Cylinder number two is active and fuel is being injected to cylinder number two via port and DI injectors when trace 506 is at a higher level near the vertical axis arrow. Cylinder number two is not active and fuel is not being injected to cylinder number two when trace 506 is at a lower level near the horizontal axis. Trace 506 represents the operating status of cylinder number two. The horizontal axis represents time and time increases from the left side of the plot to the right side of the plot.

The fourth plot from the top of FIG. 5 is a plot of state of a noise generating event in the engine knock window of cylinder number one. As shown in FIG. 2 a closing of a fuel injector that supplies fuel to cylinder number two may increase the engine knock background noise level for cylinder number one. Additionally, valve opening and/closing events for cylinders other than cylinder number one may increase the engine knock background noise level for cylinder number one. If a noise generating event (e.g., a fuel injector or poppet valve opening or closing) generates noise in the engine knock window of cylinder number one, trace 508 goes to a high state near the vertical axis arrow. If a noise generating event is not present in the engine knock window of cylinder number one, trace 508 goes to a low level state near the horizontal axis arrow. The vertical axis represents a state of a noise generating event in the engine knock window of cylinder number one. Trace 508 represents the noise generating event state for noise being generated in the engine knock window of cylinder number one. The horizontal axis represents time and time increases from the left side of the plot to the right side of the plot.

The fifth plot from the top of FIG. 5 is a plot of engine background noise filter number one output. The vertical axis represents engine knock background noise level filter number one output for cylinder number one and the engine knock background noise level increases in the direction of the vertical axis arrow. Trace 510 represents the engine knock background noise level filter number one output for cylinder number one. The horizontal axis represents time and time increases from the left side of the plot to the right side of the plot.

The sixth plot from the top of FIG. 5 is a plot of engine background noise filter number two output. The vertical axis represents engine knock background noise level filter number two output for cylinder number one and the engine knock background noise level increases in the direction of the vertical axis arrow. Trace 512 represents the engine knock background noise level filter number two output for cylinder number one. The horizontal axis represents time and time increases from the left side of the plot to the right side of the plot.

At time t0, the engine is operating in V8 mode and the cylinder background noise level for cylinder number one is at a higher level. The cylinder background noise level is delivered to the engine knock indicating module 350 or step 414. The cylinder background noise level is at a higher level since the engine is operating in V8 mode and noise generating events are occurring in the knock window of cylinder number one as is indicted by the state of noise generating event trace 508. The output of filter number one for determining the engine knock background noise level is at a higher level and the output of filter number two for determining the engine background noise level is at a lower level. The output value and the internal states of filter number two are held at their previous values when the state of noise generating events in the knock window of cylinder number one is high. Thus, when the state of the noise generating event in cylinder number one knock window is high, the cylinder number one background noise level follows the value of the cylinder number one background noise filter number one.

At time t2, the engine operating mode changes state from V8 to V4 responsive to vehicle operating conditions (not shown). Consequently, the cylinder background noise level for cylinder number one changes to a lower level. The cylinder background noise level is delivered to the engine knock indicating module 350 or step 414. The cylinder background noise level is at a lower level since the engine is operating in V4 mode and noise generating events are not occurring in the knock window of cylinder number one as is indicted by the state of noise generating event trace 508. The output of filter number one for determining the engine knock background noise level is at a higher level and the output of filter number two for determining the engine background noise level is at a lower level. The output value and the internal states of filter number one are held at their previous values shown just before time t1 when the state of noise generating events in the knock window of cylinder number one is low. Thus, when the state of the noise generating event in cylinder number one knock window is low, the cylinder number one background noise level follows the value of the cylinder number one background noise filter number two.

At time t2, the engine operating mode changes state back to V8 from V4 responsive to vehicle operating conditions (not shown). Therefore, the cylinder background noise level for cylinder number one changes to a higher level. The cylinder background noise level is delivered to the engine knock indicating module 350 or step 414. The cylinder background noise level is at a higher level since the engine is operating in V8 mode and noise generating events are occurring in the knock window of cylinder number one as is indicted by the state of noise generating event trace 508. The output of filter number one for determining the engine knock background noise level is at a higher level and the output of filter number two for determining the engine background noise level is at a lower level. The output value and the internal states of filter number two are held at their previous values shown just before time t2 when the state of noise generating events in the knock window of cylinder number one is high. Thus, when the state of the noise generating event in cylinder number one knock window is high, the cylinder number one background noise level follows the value of the cylinder number one background noise filter number one.

In this way, the outputs of two different digital filters may be the basis for determining the presence or absence of knock in an engine. The output of one filter is applied to determine engine knock when noise generating events occur in a knock window of a cylinder and the output of the other filter is applied to determine engine knock when noise generating events do not occur within the knock window. In addition, as previously mentioned, a plurality of filters constructed in parallel may be the basis for determining engine knock under other conditions.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine operating method, comprising:
    operating an engine in each of a first condition, wherein all cylinders of the engine are combusting fuel, and a second condition, wherein less than all of the cylinders of the engine are combusting fuel;
    inputting a rectified and integrated knock sensor output signal into two filters that are constructed in parallel, wherein a first filter of the two filters generates an output that is a higher knock background noise level using the rectified and integrated knock sensor output signal and the second filter of the two filters generates an output that is a lower knock background noise level using the rectified and integrated knock sensor output signal;
    generating an indication of knock by applying the respective output of one of the two filters, and not the other of the two filters, to the rectified and integrated knock sensor output signal to determine knock, the one of the two filters selected according to whether the engine is operating in the first condition or the second condition; and
    retarding spark timing responsive to the indication of knock via a controller.

2. The engine operating method of claim 1, where the two filters are digital filters incorporated into the controller, and wherein operating the engine in the first condition produces more noise generating events than operating the engine in the second condition.

3. The engine operating method of claim 1, wherein the first filter comprises a first filter time constant, and the second filter comprises a second filter time constant.

4. The engine operating method of claim 1, wherein generating the indication of knock by applying the output of the one of the two filters, and not the other of the two filters, to the rectified and integrated knock sensor output signal to determine knock, the one of the two filters selected according to whether the engine is operating in the first condition or the second condition, comprises:
    operating the engine in the first condition at a first time;
    in response to operating the engine in the first condition at the first time, adjusting a state of a switch to select the first filter and generate the indication of knock by applying the higher background noise level output by the first filter to the rectified and integrated knock sensor output signal;
    operating the engine in the second condition at a second time; and
    in response to operating the engine in the second condition at the second time, adjusting the state of the switch to select the second filter and generate the indication of knock by applying the lower background noise level output by the second filter to the rectified and integrated knock sensor output signal.

5. The engine operating method of claim 1, further comprising rectifying and integrating an output of a knock sensor to produce the rectified and integrated knock sensor output signal, the output of the knock sensor sampled during a knock window of a first cylinder.

6. The engine operating method of claim 5, wherein the first condition comprises an active operating state of a device that controls flow of a fluid into a second cylinder during the knock window of the first cylinder.

7. The engine operating method of claim 6, where the fluid is air and where the device is a poppet valve.

8. The engine operating method of claim 6, where the fluid is fuel and where the device is a fuel injector.

9. An engine operating method, comprising:
operating with a noise generating event associated with a first cylinder occurring within a knock window of a second cylinder at a first time;
at the first time, generating an indication of knock for the second cylinder based on an output of a first digital filter, and not a second digital filter, responsive to the noise generating event associated with the first cylinder occurring within the knock window of the second cylinder;
operating with the noise generating event associated with the first cylinder not occurring within the knock window of the second cylinder at a second time;
at the second time, generating the indication of knock for the second cylinder based on an output of the second digital filter, and not the first digital filter, responsive to the noise generating event associated with the first cylinder not occurring within the knock window of the second cylinder, the first digital filter constructed in parallel with the second digital filter; and
adjusting an engine actuator responsive to the indication of knock.

10. The engine operating method of claim 9, where the noise generating event is an opening or a closing of a fuel injector of the first cylinder, and wherein the first digital filter includes a first time constant and the second digital filter includes a second, different time constant.

11. The engine operating method of claim 9, where the noise generating event is a closing of a poppet valve of the first cylinder, and wherein generating the indication of knock for the second cylinder based on the output of the second digital filter occurs while the first cylinder is deactivated.

12. The engine operating method of claim 9, where the engine actuator is an ignition system.

13. The engine operating method of claim 9, where the engine actuator is a fuel injector.

14. The engine operating method of claim 9, wherein the output of the first digital filter is a first engine knock background noise level determined from an integrated output of a knock sensor, and the output of the second digital filter is a second engine knock background noise level, less than the first engine knock background noise level, determined from the integrated output of the knock sensor.

15. A system for operating an engine, comprising:
a variable displacement engine including a port fuel injector and a direct fuel injector for each cylinder;
at least one knock sensor coupled to the variable displacement engine; and
a controller including executable instructions stored in non-transitory memory to digitally filter output of the at least one knock sensor that has been rectified and integrated via two filters that are constructed in parallel and include outputs that are directed to a single switch, wherein a first of the two filters generates a higher knock background noise level and a second of the two filters generates a lower knock background noise level, and instructions to change a state of the single switch to generate an indication of knock based on the output of the first of the two filters during a first condition of the variable displacement engine, wherein all cylinders of the variable displacement engine are combusting fuel, and change the state of the single switch to generate the indication of knock based on the output of the second of the two filters during a second condition of the variable displacement engine, wherein less than all of the cylinders of the variable displacement engine are combusting fuel.

16. The system of claim 15, where the first condition of the variable displacement engine includes a noise generating event associated with a first cylinder occurring within a knock window of a second cylinder and the second condition of the variable displacement engine includes the noise generating event associated with the first cylinder not occurring within the knock window of the second cylinder.

17. The system of claim 16, where the knock window is a predetermined crankshaft angular region.

18. The system of claim 15, further comprising instructions for a first time constant for the first of the two filters and a second time constant for the second of the two filters.

19. The system of claim 15, further comprising additional instructions to hold an output value and internal states of the first of the two filters constant while the output of the second of the two filters is output via the single switch.

20. The system of claim 19, further comprising additional instructions to hold an output value and internal states of the second of the two filters constant while the output of the first of the two filters is output via the single switch.

* * * * *